United States Patent
Goto (10) Patent No.: US 8,767,573 B2
(45) Date of Patent: Jul. 1, 2014

(54) COMMUNICATION DEVICE AND METHOD FOR CONTROLLING THE SAME

(75) Inventor: Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 13/121,679

(22) PCT Filed: Sep. 25, 2009

(86) PCT No.: PCT/JP2009/004840
§ 371 (c)(1),
(2), (4) Date: Mar. 29, 2011

(87) PCT Pub. No.: WO2010/038383
PCT Pub. Date: Apr. 8, 2010

(65) Prior Publication Data
US 2011/0182204 A1 Jul. 28, 2011

(30) Foreign Application Priority Data
Sep. 30, 2008 (JP) ................................ 2008-253994

(51) Int. Cl.
*H04L 12/26* (2006.01)
(52) U.S. Cl.
USPC ......................................... 370/252; 370/338
(58) Field of Classification Search
None
See application file for complete search history.

(56) References Cited

U.S. PATENT DOCUMENTS

| | | | |
|---|---|---|---|
| 8,537,792 B2 * | 9/2013 | Nagai | 370/338 |
| 2007/0223670 A1 | 9/2007 | Ido | |
| 2007/0253394 A1 * | 11/2007 | Horiguchi et al. | 370/338 |
| 2008/0120398 A1 | 5/2008 | Hiroki | |
| 2010/0020777 A1 | 1/2010 | Nakajima | |
| 2010/0046394 A1 | 2/2010 | Fujii | |
| 2010/0195589 A1 | 8/2010 | Moritomo | |
| 2010/0299435 A1 * | 11/2010 | Goto | 709/225 |
| 2011/0010760 A1 * | 1/2011 | Goto | 726/4 |
| 2011/0142241 A1 * | 6/2011 | Goto | 380/279 |
| 2011/0170686 A1 * | 7/2011 | Goto | 380/44 |

FOREIGN PATENT DOCUMENTS

| | | |
|---|---|---|
| CN | 1680915 A | 10/2005 |
| CN | 101035367 A | 9/2007 |
| JP | 2004-336638 | 11/2004 |
| JP | 2007-087115 | 4/2007 |
| JP | 2007-109106 | 4/2007 |
| JP | 2007-258935 A | 10/2007 |
| JP | 2008-113156 A | 5/2008 |
| JP | 2008-131367 A | 6/2008 |
| JP | 2008-147789 A | 6/2008 |

(Continued)

OTHER PUBLICATIONS

Wi-Fi Certified (TM) for Wi-Fi Protected Setup: Easing the User Experience for Home and Small Office Wi-Fi (R) Networks, http://www.wi-fi.org/wp/wifi-protected-setup.

*Primary Examiner* — Anh-Vu Ly
(74) *Attorney, Agent, or Firm* — Canon USA, Inc. IP Division (57) ABSTRACT

When a communication parameter provided from a communication device is received in a communication parameter automatic setting process, it is determined whether the number of characters in the communication parameter is a predetermined number, whether the communication parameter includes a predetermined character, or whether the communication parameter is a communication parameter use of which is prohibited in a certain region. In accordance with a determination result, control is performed so that the communication parameter is not used.

11 Claims, 5 Drawing Sheets

(56) References Cited

FOREIGN PATENT DOCUMENTS

| JP | 2008-160173 A | 7/2008 |
| JP | 2008-172407 A | 7/2008 |
| JP | 2008-187348 A | 8/2008 |
| KR | 10-0653368 B1 | 11/2006 |
| WO | 2008/093817 | 8/2008 |

* cited by examiner

COMMUNICATION DEVICE AND METHOD FOR CONTROLLING THE SAME

TECHNICAL FIELD

The present invention relates to a communication device and a method for controlling the communication device.

BACKGROUND ART

In wireless communication represented by communication through a wireless LAN (Local Area Network) compatible with the IEEE 802.11 standard series, many setting items are necessary to be set before use.

Examples of the setting items include communication parameters that are necessary to perform wireless communication, such as an SSID (Service Set Identifier) as a network identifier, a frequency channel, an encryption scheme, an encryption key, an authentication scheme, and an authentication key. It is very inconvenient for a user to set all such items by manual input.

Various manufacturers have devised automatic setting methods for easily setting communication parameters to a wireless device.

Recently, a society called Wi-Fi Alliance has established a standard of a communication parameter automatic setting method called Wi-Fi Protected Setup (WPS), and the method has already been employed in some products (see NPL 1).

In WPS, communication parameters are provided from a communication parameter providing device (hereinafter referred to as providing device) to a communication parameter receiving device (hereinafter referred to as receiving device) through a predetermined procedure and a message. The receiving device becomes capable of wireless LAN communication by setting the provided communication parameters to the device (see NPL 1 for details). In WPS, a communication parameter provided from the providing device to the receiving device is called "Credential".

In this way, communication parameters can be easily provided from the providing device to the receiving device by using WPS. However, there is a possibility that an unusable communication parameter is provided from the providing device due to a difference in specifications or the like between the providing device and the receiving device. In that case, even if a communication parameter is shared by the providing device and the receiving device on the basis of WPS, there is a possibility that the both devices are incapable of communicating with each other by using the communication parameter. Furthermore, even if the both devices are capable of communicating with each other by using the communication parameter shared thereby, there is a possibility that a malfunction such as garble occurs when information of the communication parameter is displayed in a display unit.

There exists a parameter that is unusable in some countries or regions where communication devices are used. For example, frequency channels use of which is permitted by a law vary in each country or region, e.g., Japan, the U.S.A., or Europe. Therefore, in the case where a communication parameter use of which is unpermitted in a region is provided, performing wireless communication using the communication parameter in the region is violation of law.

CITATION LIST

Non Patent Literature

[NPL 1]

Wi-Fi CERTIFIED™ for Wi-Fi Protected Setup: Easing the User Experience for Home and Small Office Wi-Fi (R) Networks

SUMMARY OF INVENTION

The present invention is directed to preventing use of a communication parameter that can cause a problem by being used even when the communication parameter is provided.

Further features of the present invention will become apparent from the following description of an exemplary embodiment with reference to the attached drawings.

A communication device according to an embodiment of the present invention includes a receiving unit configured to receive a communication parameter provided from another communication device in a communication parameter automatic setting process, a determining unit configured to determine whether the number of characters in the communication parameter received by the receiving unit is a predetermined number or whether the communication parameter includes a predetermined character, and a control unit configured to perform control so that the communication parameter is not used for communication if the determining unit determines that the number of characters in the communication parameter is not the predetermined number or that the communication parameter includes the predetermined character.

A communication device according to another embodiment of the present invention includes a receiving unit configured to receive a communication parameter provided from another communication device in a communication parameter automatic setting process, a determining unit configured to determine whether the communication parameter received by the receiving unit is a communication parameter use of which is prohibited in a certain region, and a control unit configured to perform control so that the communication parameter is not used if the determining unit determines that the communication parameter is the communication parameter use of which is prohibited in the certain region.

A communication device according to another embodiment of the present invention includes a receiving unit configured to receive a communication parameter including a frequency channel from another communication device, a determining unit configured to determine whether the frequency channel included in the communication parameter received by the receiving unit is a frequency channel use of which is limited among a plurality of frequency channels used for communication, and a control unit configured to perform control so that the frequency channel included in the communication parameter is not used if the determining unit determines that the frequency channel included in the communication parameter is the frequency channel use of which is limited.

DESCRIPTION OF EMBODIMENT

Hereinafter, a communication device according to an embodiment of the present invention is described in detail with reference to the attached drawings. A description is given below about an example of using a wireless LAN system compatible with the IEEE 802.11 series, but the communication form is not necessarily limited to the wireless LAN compatible with IEEE 802.11. Also, a description is given below about a case of using WPS as a communication parameter automatic setting process, but other automatic setting methods are also acceptable.

Figure 1:
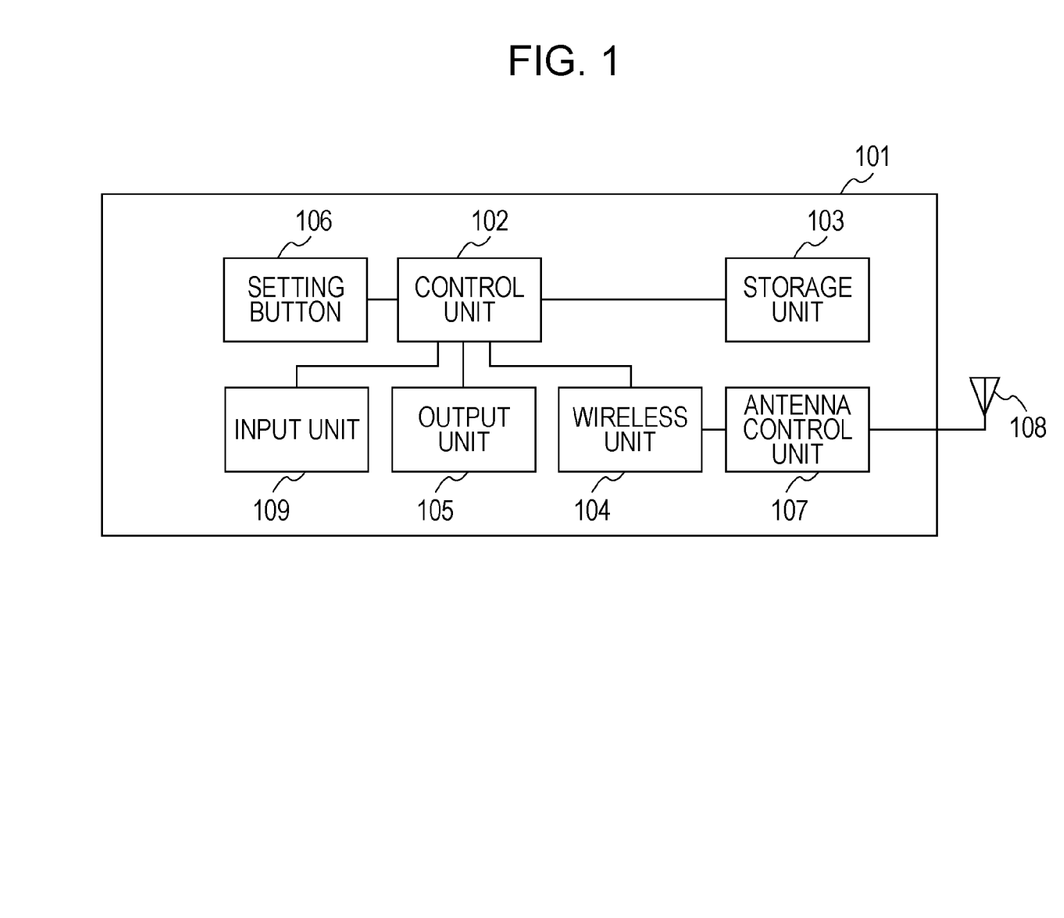
FIG. 1 is a block diagram illustrating an exemplary configuration of a device according to an embodiment of the present invention.

A hardware configuration available in this embodiment is now described. FIG. 1 is a block diagram illustrating an exemplary configuration of each of devices (described below) according to this embodiment.

Referring to FIG. 1, reference numeral 101 denotes an entire device. A control unit 102 controls the entire device 101 by executing a control program stored in a storage unit 103. The control unit 102 also performs setting control of communication parameters between the device 101 and another device. The storage unit 103 stores the control program executed by the control unit 102 and various pieces of information, such as communication parameters. Various operations described below are performed when the control unit 102 executes the control program stored in the storage unit 103.

A wireless unit 104 is used for performing wireless LAN communication compatible with the IEEE 802.11 series. An output unit 105 performs various types of output and has a function of outputting visible information, such as an LCD (Liquid Crystal Display) or an LED (Light-Emitting Diode), or a function of outputting voices, such as a speaker.

A setting button 106 is used to give a trigger for starting a communication parameter automatic setting process. The communication parameter automatic setting process starts when the setting button 106 is operated. The control unit 102 performs the process described below upon detecting the operation of the setting button 106 by a user.

The device 101 further includes an antenna control unit 107, an antenna 108, and an input unit 109.

Figure 2:
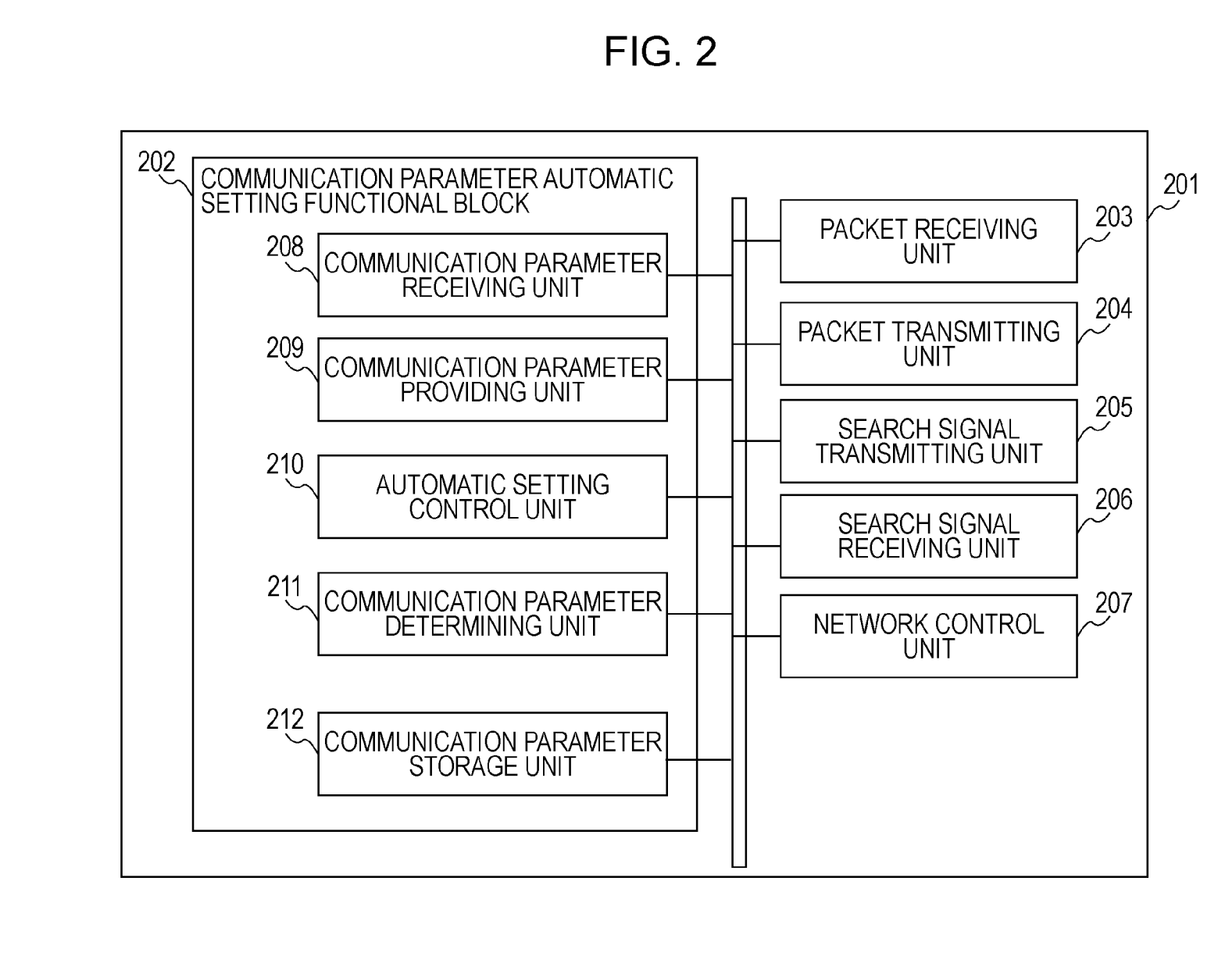
FIG. 2 is a block diagram illustrating an exemplary configuration of software functional blocks in the device according to the embodiment.

FIG. 2 is a block diagram illustrating an exemplary configuration of software functional blocks executed by each device.

Referring to FIG. 2, a device 201 includes a communication parameter automatic setting functional block 202. In this embodiment, communication parameters necessary to perform wireless LAN communication, such as an SSID as a network identifier, a frequency channel, an encryption scheme, an encryption key, an authentication scheme, and an authentication key, are automatically set. In the following description, automatic setting of communication parameters is simply referred to as automatic setting.

A packet receiving unit 203 receives packets regarding various communications. Reception of a beacon (informing signal) is performed by the packet receiving unit 203. A packet transmitting unit 204 transmits packets regarding various communications. Transmission of a beacon (informing signal) is performed by the packet transmitting unit 204.

A search signal transmitting unit 205 controls transmission of a device search signal, such as a probe request. The probe request can also be called a network search signal for searching for a desired network. Transmission of a probe request is performed by the search signal transmitting unit 205. Also, transmission of a probe response, which is a response signal to a received probe request, is performed by the search signal transmitting unit 205. When an automatic setting process is started by an operation of the setting button 106 by a user, a beacon, a probe request, and a probe response are transmitted by being added with information (IE: Information Element) indicating that automatic setting is being performed (automatic setting process is being performed).

A search signal receiving unit 206 controls reception of a device search signal, such as a probe request, from another device. Reception of a probe request is performed by the search signal receiving unit 206. Also, reception of a probe response is performed by the search signal receiving unit 206. Various pieces of information about a transmission source are added to a device search signal and a response signal thereto.

A network control unit 207 controls network connections. A process of connecting to a wireless LAN or the like is performed by the network control unit 207.

In the automatic setting functional block 202, a communication parameter receiving unit 208 receives communication parameters from a device on the other side, and a communication parameter providing unit 209 provides communication parameters to a device on the other side. An automatic setting control unit 210 controls various protocols in automatic setting. The automatic setting process described below is performed by the communication parameter receiving unit 208 and the communication parameter providing unit 209 on the basis of control by the automatic setting control unit 210. Also, whether an elapsed time from the start of an automatic setting process has exceeded a limit time of the setting process is determined by the automatic setting control unit 210. If it is determined that the elapsed time has exceeded the limit time, the automatic setting process is stopped under control by the automatic setting control unit 210.

A communication parameter determining unit 211 determines content of each communication parameter provided by a providing device. The communication parameter determining unit 211 determines whether a communication parameter received by the communication parameter receiving unit 208 is usable (details are described below).

A communication parameter storage unit 212 stores communication parameters provided by the providing device. The communication parameter storage unit 212 corresponds to the storage unit 103. The communication parameter storage unit 212 may store only one or more communication parameters that have been determined to be usable by the communication parameter determining unit 211 among the communication parameters received by the communication parameter receiving unit 208. Alternatively, all the communication parameters received by the communication parameter receiving unit 208 may be once stored in the communication parameter storage unit 212, and one or more communication parameters that have been determined to be unusable by the communication parameter determining unit 211 may be deleted. Alternatively, the communication parameter storage unit 212 may store one or more communication parameters that have been determined to be unusable by the communication parameter determining unit 211 as unusable communication parameters.

All the functional blocks have a mutual software or hardware relationship. The above-described functional blocks are only examples. A plurality of functional blocks may constitute a single functional block, or any of the functional blocks may be divided into a plurality of blocks having different functions.

Figure 3:
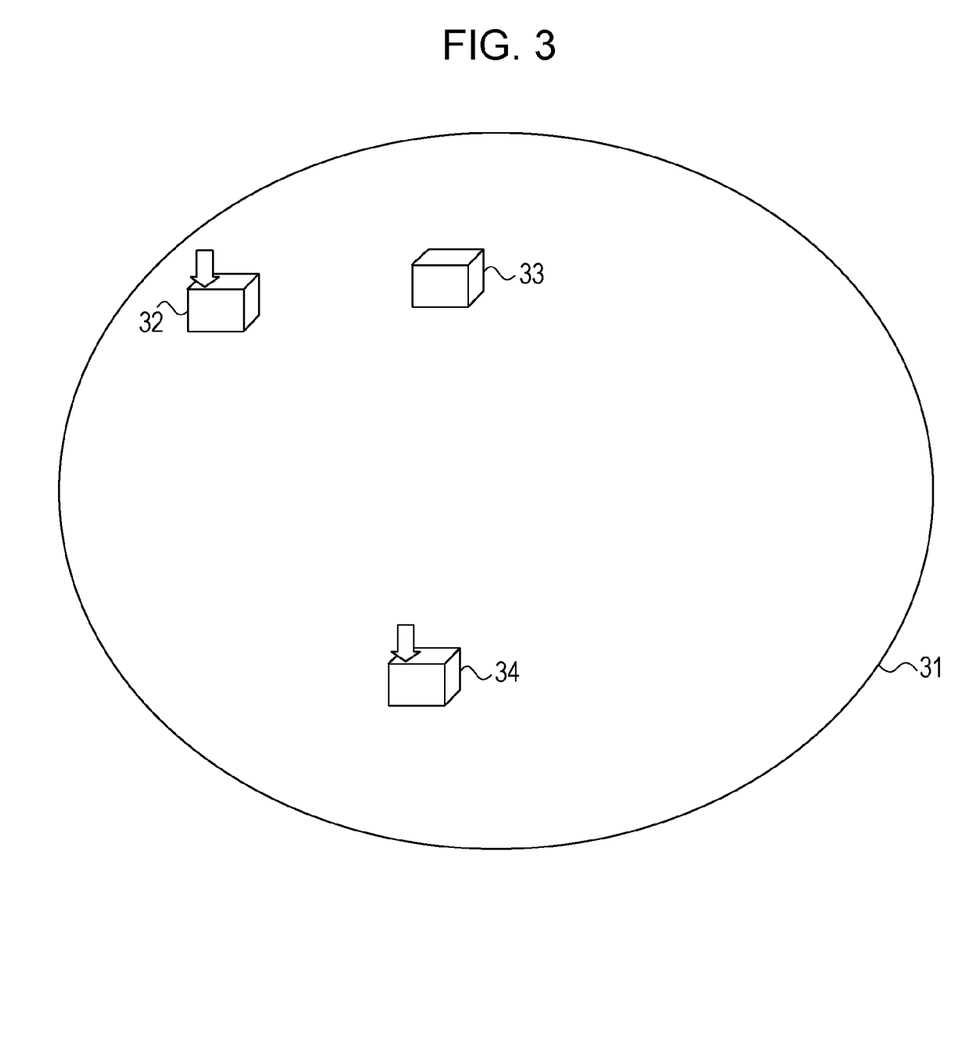
FIG. 3 illustrates a network configuration according to the embodiment.

FIG. 3 illustrates a communication device A 32 (hereinafter referred to as device A), a communication device B 33 (hereinafter referred to as device B), and a communication device C 34 (hereinafter referred to as device C) on a network A 31. All of these devices have the above-described configuration illustrated in FIGS. 1 and 2.

In this embodiment, operating the setting button 106 in both of the devices A and C causes an automatic setting process to be performed between the devices A and C. Any of the devices A and C may be a providing device or a receiving device of communication parameters. Here, a description is given under the assumption that the device A operates as a providing device and that the device C operates as a receiving device.

Figure 4:
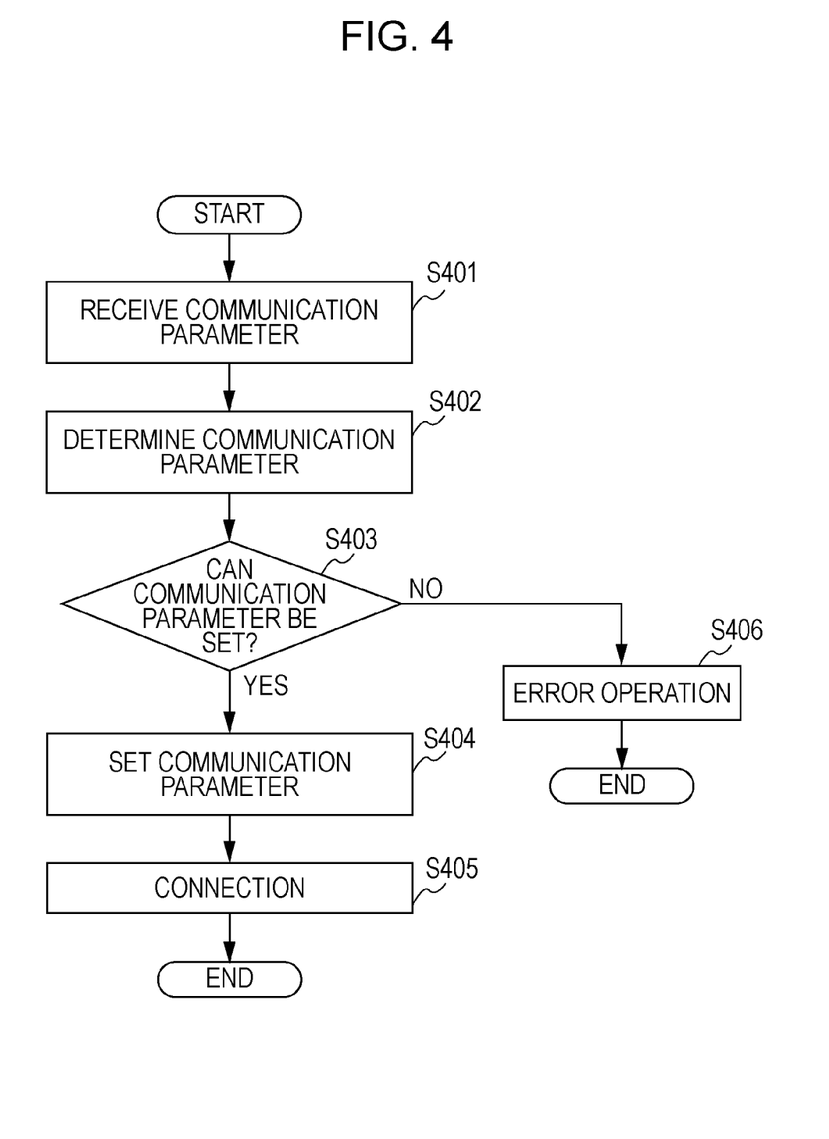
FIG. 4 is a flowchart of a communication parameter automatic setting process on the side of a device C according to the embodiment.

FIG. 4 is a flowchart of a communication parameter automatic setting process on the side of the device C operating as a communication parameter receiving device.

Upon operation of the setting button 106 in the devices A and C, the device C starts an automatic setting process with the device A.

In the automatic setting process, the device C receives a communication parameter from the device A (step S401). Then, the device C determines whether the received communication parameter can be set as a communication parameter to be used for wireless communication (step S402).

The following are cases where there is provided a communication parameter that is unpermitted to be set in the device C.

(1) The case where there is provided a communication parameter not satisfying conditions (the number of characters, usable characters, etc.) specified by a wireless LAN standard series of the IEEE 802.11 series.

(2) The case where there is provided a communication parameter that satisfies the conditions specified by the wireless LAN standard series of the IEEE 802.11 series but that can cause malfunction or communication failure when being set in the receiving device.

(3) The case where there is provided a communication parameter use of which is prohibited by a law of the country or region where the communication parameter is to be used.

First, (1) is described.

The IEEE 802.11i standard specifies that a passphrase (a kind of encryption key) necessary for encrypting and authenticating processes should be within the range of 8 to 63 English one byte characters (characters in the range from 0x20 to 0x7E in the ASCII code).

The device A, which is a communication parameter providing device, provides the device C with a passphrase automatically generated on the basis of a predetermined algorithm. Here, if an error occurs during the automatic generation, a passphrase not satisfying conditions specified by the IEEE 802.11i standard may be transmitted from the device A. For example, a passphrase of 7 characters or less or 64 characters or more, or a passphrase including a control character other than English one byte characters (control code indicated by 0x00 to 0x1F and 0x7F in the ASCII code, such as CR or LF) may be provided.

A passphrase is described as an example here. However, in some of the other communication parameters, the number of characters and usable characters are specified by the wireless LAN standard of the IEEE 802.11 series.

Next, (2) is described.

The IEEE 802.11 standard specifies that an SSID should be an octet string of 32 characters. The standard allows any value as long as this condition is satisfied.

The device A, which is a communication parameter providing device, provides the device C with an SSID generated on the basis of a predetermined algorithm or an SSID input by a user.

In the case where the device A automatically generates an SSID, there is a possibility that an SSID including a NULL character (0x00 in the ASCII code) is generated and is transmitted to the device C. Even if a NULL character is included in the SSID, no problem occurs in terms of the IEEE 802.11 standard, but the NULL character and the characters thereafter may be unrecognizable depending on the specifications of the device C. In that case, less than 32 characters in the SSID are recognizable by the device C although the SSID of 32 characters has been provided, so that the IEEE 802.11 standard is not satisfied. As a result, the device C is incapable of performing wireless communication with the device A, although the device A is capable of performing wireless communication using the SSID.

In the case where the device A has generated and provided an SSID including a NULL character, the device A may use the SSID in which the NULL character has been deleted and another character has been automatically supplied. However, the device C does not necessarily have the same automatic supplying function as that of the device A. Even if the device C has the automatic supplying function, there is a possibility that the device C supplies a character different from that supplied by the device A. As a result, wireless communication is inexecutable between the devices A and C.

Furthermore, in the case where the device A automatically generates an SSID, there is a possibility that an SSID including a control character other than English one byte characters (CR, LF, etc.) is generated and is provided to the device C. Even if a control character is included in the SSID, no problem occurs in terms of the IEEE 802.11 standard, and thus the device C can perform wireless communication using the SSID. However, depending on the specifications of the device C, garble may occur when the SSID is displayed in the output unit 105.

In the case where the user inputs an SSID in the device A, the user can input characters expressed by a multibyte code, such as Hiragana or Kanji, depending on the specifications of the device A. When a communication parameter including a character expressed by a multibyte code is provided, garble can occur when the communication parameter is displayed in the output unit 105 depending on the specifications of the device C even if the communication parameter can be used for wireless communication. Such a problem can occur when a convertible character code varies between the devices A and C due to a difference in country of sale or the like.

As described above, a difference in specifications between the providing device and the receiving device can cause wireless communication failure or malfunction when a provided communication parameter is set. In some devices, initialization to factory default is necessary to change setting to a new communication parameter after such an inappropriate communication parameter has once been set.

An SSID is used as an example here, but the same cases occur in an encryption key or a user ID used in IEEE 802.1x authentication.

Finally, (3) is described.

The IEEE 802.11g standard specifies that frequency channels (communication channels) 1*ch* to 13*ch* are available. However, not all the channels 1*ch* to 13*ch* are available depending on a region where the communication device is used. For example, all the channels 1ch to 13ch are available in Japan, but the use of channels 12ch and 13ch is prohibited in the U.S.A., that is, only the channels 1ch to 11ch are available there. Therefore, when a communication device is used in the U.S.A., setting of a communication channel to 12ch is unpermitted even if 12ch is provided as a communication channel from a providing device.

Figure 5:
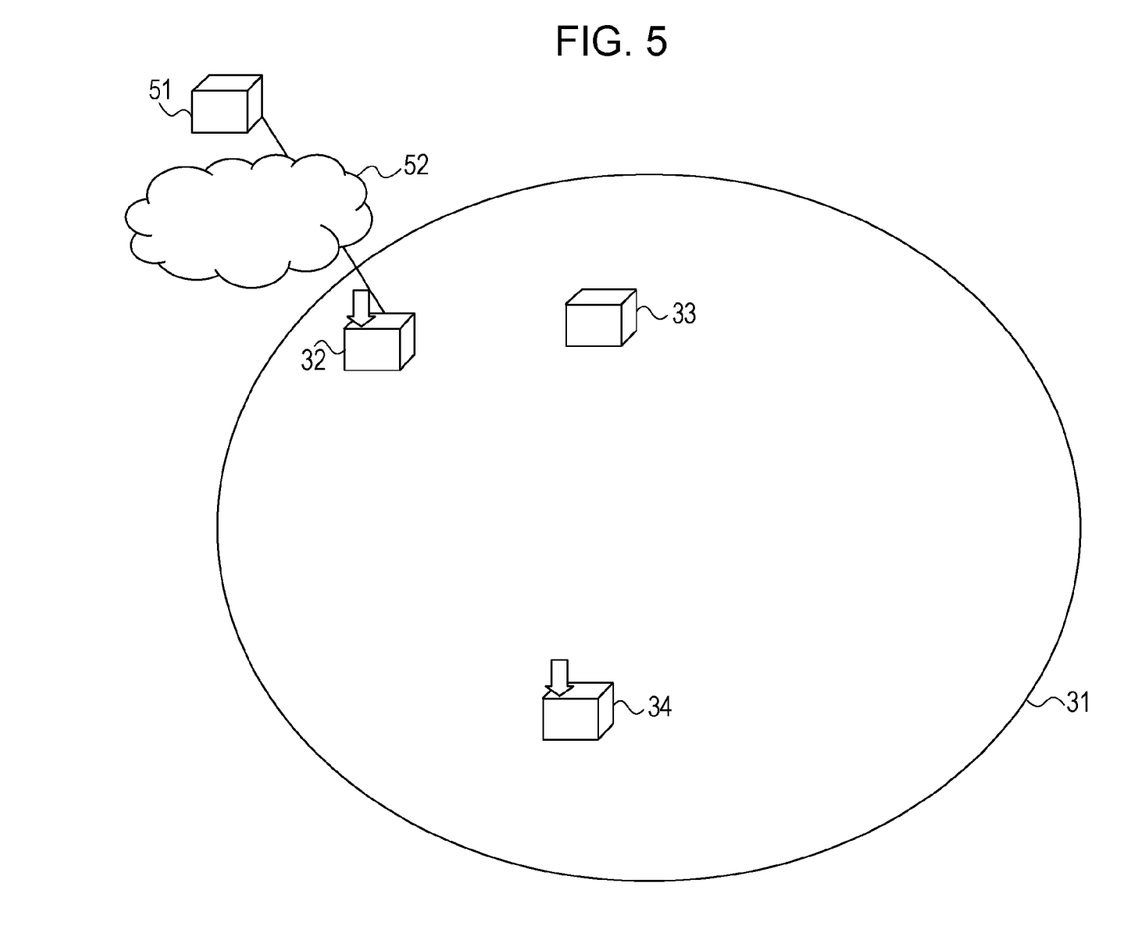
FIG. 5 illustrates another network configuration according to the embodiment.

Now, a description is given with an example about a network configuration where there is a possibility that a communication channel of an unusable value is provided. FIG. 5 is a diagram in which a communication device D 51 (hereinafter referred to as device D) and the Internet 52 (hereinafter referred to as the Internet) are added to the network configuration illustrated in FIG. 3.

In the network configuration illustrated in FIG. 5, the device A, which is a communication parameter providing device, is capable of transferring a communication parameter transmitted from the device D via the Internet to the device C. In the case where the communication device D exists in Japan and where the network A exists in the U.S.A., there is a possibility that a communication channel having a value usable in Japan but unusable in the U.S.A. may be provided as a communication parameter to the device C. In this case, even if the provided communication channel is set in the device C, the communication channel is not set in the device A, and thus the device C is incapable of performing wireless communication with the device A. Even if the communication channel is set in the device A and if the device C is capable of performing wireless communication with the device A, the wireless communication is violation of law.

In the case where the device A, which operates as a providing device, is sold in Japan, the same problem can occur even in the network configuration illustrated in FIG. 3 if the device A is used in the U.S.A.

A value that can be used in a limited region may exist in the other communication parameters, such as an SSID, an encryption key, and an authentication key. There is a possibility that such a communication parameter is provided through an automatic setting process.

As described above, there is a possibility that a communication parameter inappropriate for the device C is provided from the device A. For this reason, the device C determines in step S403 whether the provided communication parameter can be set.

Specifically, the device C determines whether the provided communication parameter satisfies the conditions specified by the above-described wireless LAN standard, that is, whether the number of characters in the communication parameter is the number specified by the wireless LAN standard or whether the communication parameter includes an unusable character. Also, the device C determines whether the provided communication parameter includes a character that causes a problem when being set in the device C. The device C may store the number of characters specified by the wireless LAN standard in the storage unit 103 in advance and may determine whether the number of characters of the provided communication parameter matches the stored number. Also, the device C may store characters unusable under the wireless LAN standard and characters that can cause communication failure or malfunction depending on the specifications of the device C in the storage unit 103 in advance and may determine whether the provided communication parameter includes any of the characters. The number of characters and the characters may be stored in the storage unit 103 at factory shipment, or may be arbitrarily set by a user.

Also, the device C determines whether the value of the provided communication parameter is a value use of which is limited in the region where the device C is used. For example, a value of a communication parameter use of which is prohibited in a selling area may be set at factory shipment, and the device C may determine whether the value of the provided communication parameter matches the set value. Also, information about respective regions, such as the U.S.A., Europe, and Japan, and values of communication parameters use of which is prohibited in the respective regions may be stored by being associated with each other so that a user can set a usage region before using the communication device. In this case, it may be determined whether the value of the communication parameter stored while being associated with the information about the region set by the user matches the value of the provided communication parameter. Alternatively, a value of a communication parameter use of which is permitted may be set instead of a value use of which is prohibited, and it may be determined whether the value of the provided communication parameter matches the set value.

If it is determined that the provided communication parameter is a communication parameter that is not permitted to be set (NO in step S403), an error operation described below is performed (step S406).

The above-described process enables preventing a communication parameter out of the standard of the IEEE 802.11 series from being set, and reducing the probability of inconvenience caused by a communication parameter out of the standard of the IEEE 802.11 series, e.g., wireless communication compatible with the standard is not performed, or mutual connectivity with another communication device is not ensured.

Also, occurrence of communication failure or malfunction caused by setting of a communication parameter inappropriate for the receiving device can be prevented.

Furthermore, a communication parameter use of which is limited in a region or country can be prevented from being set.

As a result of the determination made in step S402, if the device C determines that the received communication parameter can be set and used, the device C sets the communication parameter as a communication parameter to be used for wireless communication (step S404). Then, the device C makes connection to the device A by using the set communication parameter (step S405).

The error operation in step S406 is described.

In the error operation, a message indicating that the received communication parameter is unusable or inappropriate may be transmitted to the device A, which is a providing device. Alternatively, a message for requesting the device A to provide a communication parameter different from the provided communication parameter may be transmitted. The above-described both messages may be transmitted as a single message. When the device C receives a new communication parameter from the device A that has received those messages, the device C is capable of performing wireless communication.

Alternatively, error display may be performed in the output unit 105 of the communication device C in order to notify a user that the received communication parameter is unusable or that an unusable communication parameter has been provided. At this time, a message prompting the user to set the communication parameter in another method (e.g., manual input or another automatic setting method) may be displayed. Accordingly, the user can determine to set the communication parameter in another method after recognizing the display in the output unit 105.

A communication parameter that has been determined to be unusable may be deleted or may be stored in the storage unit 103 as an unusable communication parameter.

In the case where the device C can handle a communication parameter automatic setting process other than WPS, the other automatic setting process may be automatically started.

Only one of the above-described various error operations may be performed, or a plurality of the error operations may be performed in combination.

In an automatic setting process, a plurality of communication parameters including different frequency channels, different encryption keys, and the like are simultaneously provided in some cases. For example, a communication parameter A (SSID1, frequency channel 1, encryption key 1, etc.) and a communication parameter B (SSID1, frequency channel 2, encryption key 2, etc.) may be simultaneously provided. In such a case, the above-described determination (step S402) may be performed on each of the plurality of provided communication parameters, and the above-described error operation may be performed only when it is determined that all the communication parameters are unusable. When any one of the communication parameters is determined to be usable, the usable communication parameter is automatically set, and neither error notification to the providing device nor error display in the output unit 105 is performed. Accordingly, an unnecessary automatic setting process can be prevented from being performed. Furthermore, wireless communication can be performed without causing the user to be conscious that an unusable communication parameter is provided.

As described above, according to this embodiment, a communication parameter that can cause a problem when being used can be prevented from being set by carefully examining the content of a communication parameter received in a communication parameter automatic setting process.

Also, an unstable operation of the communication device due to automatic setting of such a communication parameter can be prevented, which contributes to enhanced safety of the communication device. Furthermore, automatic setting of a communication parameter that is unusable in a country or region can be prevented.

In the description given above, a provided communication parameter is automatically set (step S404) if it is determined that the communication parameter is usable (YES in step S403). However, the setting does not necessarily follow the determination. That is, an error operation (step S406) is performed if it is determined that the provided communication parameter is unusable (NO in step S403), whereas the process illustrated in FIG. 4 may be ended if it is determined that the provided communication parameter is usable (YES in step S403). Then, when instructions to start wireless communication are provided by an operation by the user, wireless communication may be performed by setting the communication parameter that has been determined to be usable.

According to the description given above, (i) whether the number of characters in a provided communication parameter is a predetermined number, (ii) whether the parameter includes a predetermined character, and (iii) whether the use of the parameter is limited in a certain region are determined to determine whether the communication parameter is usable. Alternatively, any one of (i) to (iii) may be determined.

In the description given above, a wireless LAN compatible to IEEE 802.11 is used as an example. However, an embodiment of the present invention can be carried out with another type of wireless medium, such as a wireless USB, MBOA, Bluetooth (registered TM), UWB, or ZigBee. Alternatively, an embodiment of the present invention can be carried out with a wired communication medium, such as a wired LAN.

MBOA stands for Multi Band OFDM Alliance. UWB includes wireless USB, wireless 1394, WINET, and the like.

In the description given above, examples of communication parameters include a network identifier, an encryption scheme, an encryption key, an authentication scheme, and an authentication key. Of course, other types of information may be included in the communication parameters.

In the present invention, a storage medium storing a software program code for realizing the above-described functions may be supplied to a system or a device, and a computer (CPU or MPU) of the system or the device may read and execute the program code stored in the storage medium. In that case, the program code itself read from the storage medium realizes the above-described functions of the embodiment, and thus the storage medium storing the program code constitutes the present invention.

Examples of the storage medium for supplying the program code may include a flexible disk, a hard disk, an optical disc, a magneto-optical disc, a CD-ROM (Compact Disc Read Only Memory), a CD-R (Compact Disc Recordable), a magnetic tape, a nonvolatile memory card, a ROM, and a DVD (Digital Versatile Disc).

In addition to the realization of the above-described functions by executing program code read by a computer, an OS running on the computer may perform some or all actual processes according to an instruction of the program code, thereby realizing the above-described functions. OS stands for Operating System.

Furthermore, the program code read from the storage medium may be written in a memory provided in a function expansion board inserted into the computer or a function expansion unit connected to the computer, and thereafter a CPU provided in the function expansion board or function expansion unit may perform some or all actual processes according to an instruction of the program code, thereby realizing the above-described functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-253994, filed Sep. 30, 2008, which is hereby incorporated by reference herein in its entirety.

The invention claimed is:

1. A communication device comprising:
    a receiving unit configured to receive a communication parameter provided from another communication device in a communication parameter automatic setting process;
    a determining unit configured to determine whether the number of characters in the communication parameter received by the receiving unit is a predetermined number or whether the communication parameter includes a predetermined character; and
    a control unit configured to control so that the communication parameter is not used for communication if the determining unit determines that the number of characters in the communication parameter is not the predetermined number or that the communication parameter includes the predetermined character.

2. The communication device according to claim 1, wherein the determining unit determines whether the number of characters in the received communication parameter is the number of characters specified by a wireless LAN standard of the 802.11 series or whether the received communication parameter includes a character other than characters specified by the wireless LAN standard of the 802.11 series.

3. The communication device according to claim 1, wherein the determining unit determines whether the received communication parameter includes a control character.

4. The communication device according to claim 1, wherein the determining unit determines whether the received communication parameter includes Hiragana or Kanji.

5. The communication device according to claim 1, wherein the control unit notifies the other communication device of an error.

6. The communication device according to claim 1, wherein the control unit requests the other communication device to newly provide a communication parameter different from the received communication parameter.

7. The communication device according to claim 1, wherein the control unit notifies a user of an error.

8. The communication device according to claim 1, wherein the control unit performs notification to prompt a user to set a communication parameter in a method different from the automatic setting process.

9. The communication device according to claim 1, wherein the control unit automatically starts a process of setting a communication parameter in a method different from the automatic setting process.

10. A method for controlling a communication device, comprising:
 receiving a communication parameter provided from another communication device in a communication parameter automatic setting process;
 determining whether the number of characters in the received communication parameter is a predetermined number or whether the communication parameter includes a predetermined character; and
 controlling so that the received communication parameter is not used for communication if communication device determines that the number of characters in the received communication parameter is not the predetermined number or that the received communication parameter includes the predetermined character.

11. A non-transitory computer-readable storage medium storing a computer program for making a computer execute a control method according to claim 10.

* * * * *